(12) United States Patent
Lee et al.

(10) Patent No.: US 7,088,856 B2
(45) Date of Patent: Aug. 8, 2006

(54) METHOD FOR QUANTIZATION OF HISTOGRAM BIN VALUE OF IMAGE

(75) Inventors: Ji Eun Lee, Seoul (KR); Hyeon Jun Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/988,587

(22) Filed: Nov. 16, 2004

(65) Prior Publication Data

US 2005/0089222 A1     Apr. 28, 2005

Related U.S. Application Data

(63) Continuation of application No. 09/712,932, filed on Nov. 16, 2000, now Pat. No. 6,952,495.

(30) Foreign Application Priority Data

Nov. 19, 1999   (KR) ............................... 1999-51428

(51) Int. Cl.
*G06K 9/00* (2006.01)

(52) U.S. Cl. ................. 382/168; 382/162; 382/251; 348/404.1

(58) Field of Classification Search ........... 382/166, 382/168–172, 251, 273; 348/404.1–406.1
See application file for complete search history.

(56) References Cited

U.S. PATENT DOCUMENTS

| | | | |
|---|---|---|---|
| 4,353,092 A * | 10/1982 | Bailey et al. | ............... 348/672 |
| 4,941,037 A * | 7/1990 | Sasaki et al. | ............... 358/517 |
| 5,063,607 A | 11/1991 | FitzHenry et al. | |
| 5,210,820 A | 5/1993 | Kenyon | |
| 5,298,896 A | 3/1994 | Lei et al. | |
| 5,546,474 A | 8/1996 | Zuniga | |
| 5,559,899 A * | 9/1996 | Schmidt | ............... 382/224 |
| 5,734,744 A | 3/1998 | Wittenstein et al. | |
| 5,832,118 A * | 11/1998 | Kim | ............... 382/224 |
| 5,835,117 A | 11/1998 | Small | |
| 5,850,482 A | 12/1998 | Meany et al. | |
| 5,883,968 A | 3/1999 | Welch et al. | |
| 5,960,371 A | 9/1999 | Saito et al. | |
| 5,995,095 A | 11/1999 | Ratakonda | |
| 6,127,669 A | 10/2000 | Sidiropoulos et al. | |
| 6,128,346 A | 10/2000 | Suarez et al. | |

(Continued)

FOREIGN PATENT DOCUMENTS

JP         09-149257         6/1997

(Continued)

OTHER PUBLICATIONS

Abdel-Mottaleb M. et al., "MPEG-7: A Content Description Standard Beyond Compression," IEEE 42nd Midwest Symposium on Circuits and Systems, Aug. 1999, Section 3.1.1 pp. 770-777.

(Continued)

*Primary Examiner*—Jingge Wu
*Assistant Examiner*—Aaron Carter
(74) *Attorney, Agent, or Firm*—Fleshner & Kim, LLP

(57) ABSTRACT

A method for quantization of a color histogram bin value of an image or video, and more particularly, a method for non-uniform quantization of a color histogram bin value of an image (or video) according to the frequency of color occurrence is provided. The methods effectively represent the characteristics of a color histogram of an image in comparison to conventional art, and improve the performance of image retrieval when an image (video) retrieval search is conducted.

3 Claims, 3 Drawing Sheets

16 LEVEL ($2^4$=4bits) QUANTIZATION OF NON-UNIFORM QUANTIZATION

| BINARY NOTATION OF QUANTUM VALVE | QUANTUM VALVE | QUANTIZATION SECTION |
|---|---|---|
| 0000 | 0 | 0 |
| 0001 | 1/15=0.0667 | 0.0001 ~ 0.0071 |
| 0010 | 2/15 | 0.0072 ~ 0.0142 |
| 0011 | 3/15 | 0.0144 ~ 0.0214 |
| 0100 | 4/15 | 0.0215 ~ 0.0285 |
| 0101 | 5/15 | 0.0286 ~ 0.0356 |
| 0110 | 6/15 | 0.0357 ~ 0.0428 |
| 0111 | 7/15 | 0.0429 ~ 0.0499 |
| 1000 | 8/15 | 0.0500 ~ 0.0570 |
| 1001 | 9/15 | 0.0571 ~ 0.0642 |
| 1010 | 10/15 | 0.0643 ~ 0.0713 |
| 1011 | 11/15 | 0.0714 ~ 0.0784 |
| 1100 | 12/15 | 0.0785 ~ 0.0855 |
| 1101 | 13/15 | 0.0856 ~ 0.0927 |
| 1110 | 14/15 | 0.0928 ~ 0.0999 |
| 1111 | 1 | 0.1000 ~ 1.0000 |

U.S. PATENT DOCUMENTS 6,292,126 B1 * 9/2001 Chelehmal et al. ......... 341/155
6,504,954 B1 1/2003 Goldstein
6,529,202 B1 3/2003 Wu
6,597,738 B1 7/2003 Park et al.

FOREIGN PATENT DOCUMENTS

KR 2001-11701 2/2001

OTHER PUBLICATIONS

Park, Du-Sik et al., "Image Indexing Using Weighted Color Histogram," IEEE International Conference on Image Analysis and Processing, Los Alamitos, CA, Sep. 27, 1999, pp. 909-914.

Sawhney, H.S. et al., "Efficient Color Histogram Indexing," IEEE International Conference on Image Processing, Los Alamitos, CA, Nov. 13, 1994 pp. 66-70.

Stricker, Markus and Marcus Orengo, "Similarity of Color Images," SPIE vol. 2420, Bellingham, VA, Feb. 9, 1995, pp. 381-392.

Stricker, Markus and Michael Swain, "The Capacity of Color Histogram Indexing," IEEE Computer Society Conference on Computer Vision and Pattern Recognition, Los Alamitos, CA, Jun. 21, 1994, pp. 704-708.

Jacobs, I.M. and Leonard Kleinrock, "Prefix Coding of Histograms for Minimal Storage," IEEE Transactions on Communication Technology, vol. Com-15, Apr. 2, 1967, pp. 149-155.

Iwanisky A., W. Wilhelmi, "Lexikon der Computergraphik und Bildverarbeitung," 1994, Viewe, Braunschweig, p. 230.

Du-Sik Park et al., "Image Indexing Using Weighted Color Histogram," Sep. 27, 1999.

* cited by examiner

FIG. 1
CONVENTIONAL ART

16 LEVEL($2^4$=4bits) QUANTIZATION OF UNIFORM QUANTIZATION

| BINARY NOTATION OF QUANTUM VALVE | QUANTUM VALVE | QUANTIZATION SECTION |
|---|---|---|
| 0000 | 0 | 0.0000 ~ 0.0624 |
| 0001 | 1/15=0.0667 | 0.0625 ~ 0.1249 |
| 0010 | 2/15 | 0.1250 ~ 0.1874 |
| 0011 | 3/15 | 0.1875 ~ 0.2499 |
| 0100 | 4/15 | 0.2500 ~ 0.3124 |
| 0101 | 5/15 | 0.3125 ~ 0.3749 |
| 0110 | 6/15 | 0.3750 ~ 0.4374 |
| 0111 | 7/15 | 0.4375 ~ 0.4999 |
| 1000 | 8/15 | 0.5000 ~ 0.5624 |
| 1001 | 9/15 | 0.5625 ~ 0.6249 |
| 1010 | 10/15 | 0.6250 ~ 0.6874 |
| 1011 | 11/15 | 0.6875 ~ 0.7499 |
| 1100 | 12/15 | 0.7500 ~ 0.8124 |
| 1101 | 13/15 | 0.8125 ~ 0.8749 |
| 1110 | 14/15 | 0.8750 ~ 0.9374 |
| 1111 | 1 | 0.9375 ~ 1.0000 |

FIG. 3

16 LEVEL ($2^4$=4bits) QUANTIZATION OF NON-UNIFORM QUANTIZATION

| BINARY NOTATION OF QUANTUM VALVE | QUANTUM VALVE | QUANTIZATION SECTION |
|---|---|---|
| 0000 | 0 | 0 |
| 0001 | 1/15=0.0667 | 0.0001 ~ 0.0071 |
| 0010 | 2/15 | 0.0072 ~ 0.0142 |
| 0011 | 3/15 | 0.0144 ~ 0.0214 |
| 0100 | 4/15 | 0.0215 ~ 0.0285 |
| 0101 | 5/15 | 0.0286 ~ 0.0356 |
| 0110 | 6/15 | 0.0357 ~ 0.0428 |
| 0111 | 7/15 | 0.0429 ~ 0.0499 |
| 1000 | 8/15 | 0.0500 ~ 0.0570 |
| 1001 | 9/15 | 0.0571 ~ 0.0642 |
| 1010 | 10/15 | 0.0643 ~ 0.0713 |
| 1011 | 11/15 | 0.0714 ~ 0.0784 |
| 1100 | 12/15 | 0.0785 ~ 0.0855 |
| 1101 | 13/15 | 0.0856 ~ 0.0927 |
| 1110 | 14/15 | 0.0928 ~ 0.0999 |
| 1111 | 1 | 0.1000 ~ 1.0000 |

METHOD FOR QUANTIZATION OF HISTOGRAM BIN VALUE OF IMAGE

This application is a Continuation of prior application Ser. No. 09/712,932, filed Nov. 16, 2000, which is hereby incorporated by reference now U.S. Pat. No. 6,952,495.

BACKGROUND OF THE INVENTION

1. Field of the Invention

The present invention relates to a method for quantization of a histogram bin value of an image or video, and more particularly, to a method for non-uniform quantization of a color histogram bin value of an image (or video) according to the frequency of color occurrence.

2. Description of the Background Art

Conventionally, it is possible to reduce the amount of information for expressing a color histogram of an image if the color histogram bin value is quantized. However, the color histogram bin value is merely quantized uniformly, irrespective of the frequency of color occurrence in images.

FIG. 1 is a view illustrating an example of a table of uniform quantization of a color histogram bin value according to the conventional art. In other words, the color histogram bin value is quantized by partition into uniform intervals.

For example, when the color histogram bin value ranges from 0 to 1 and the bin value is expressed by 16 numbers of branch using 4-bits, it is quantized by partition into uniform sections of 0.0625 ($1/16=0.0625$).

However, the color histogram bin value is generally low in natural image (In FIG. 2, for example, there is almost no bin having a bin value of more than 0.1), particularly, bins having a bin value of 0 occupy the most part of the whole color histogram bins (In FIG. 2, for example, more than 95% of the whole color histogram bins).

Therefore, a color histogram bin value near to 0 has to be quantized finely by a large number so that the intervals of the bin value are small. In addition, a color histogram bin value near to 1 can be quantized coarsely by a small number so that the intervals of the bin value are large.

However, as described above, in the method for quantization of a color histogram bin value according to the conventional art, there arises a problem that the information of the color histogram is lost, since the color histogram is uniformly quantized irrespective of the frequency of the color histogram bin value.

For example, if the color histogram bin value is quantized without considering its characteristics, such as the existence or non-existence of a certain particular color in a certain image and the frequent occurrence or infrequent occurrence of a color in the image, the unique information of the color histogram, which is an important information as one of the characteristics of the image, cannot be precisely preserved.

In addition, since the unique information of the color histogram cannot be precisely preserved, it causes a problem that it is difficult for the information about quantization of color histogram bin value to obtain sufficient reliability in reflecting the characteristics of the image, where the information about quantization of color histogram bin value is usually used as a characteristic information of an image. In addition, if the information poorly reflecting the color histogram characteristics of the image is used, the performance of image searching is degraded for the image retrieval.

In addition, if the information poorly reflecting the color histogram characteristics of the image is used, there arises a problem that the image characteristics are not consistent with the visual/sensible characteristics of a human being.

SUMMARY OF THE INVENTION

Accordingly, it is an object of the present invention to provide a method for quantization of a color histogram bin value of an image (or video) in which the color histogram bin value is non-uniformly quantized in consideration of the frequency of color occurrence.

It is another object of the present invention to provide a method for quantization of a color histogram bin value of an image in which the characteristics of the color histogram reflects well the characteristics of the image by means of non-uniformly quantizing the color histogram bin value of the image (or video) in consideration of the frequency of color occurrence.

It is another object of the present invention to provide a method for quantization of a color histogram bin value of an image in which the image (or video) retrieval performance is improved by applying the quantization of the color histogram bin value.

It is another object of the present invention to provide a method for quantization of a color histogram bin value of an image which makes it possible to construct a database of the information of the characteristics of the image, that is consistent with the visual/sensible characteristics of a human being by applying the quantization of the color histogram bin.

It is another object of the present invention to provide a method for quantization of a color histogram bin value of an image which can improve the performance of the image retrieval with the same amount of information in representing and storing the color histogram as that in the conventional quantization method.

To achieve the above object, there is provided a method for quantization of a color histogram bin value of an image which is achieved by non-uniformly quantizing the color histogram bin value according to the frequency of color occurrence.

To achieve the above object, there is provided another method for quantization of a color histogram bin value of an image which is achieved by uniformly quantizing the color histogram bin values into a large number of sections if the bin value is greater than '0' and less than a predetermined threshold, mapping the color histogram bin values into a single quantum if the bin value is greater than the threshold and mapping the color histogram bin value '0' into a single quantum.

To achieve the above object, there is provided another method for quantization of a color histogram bin value of an image which is achieved by non-uniformly quantizing the section where the color histogram bin value of the image is greater than '0' and less than a predetermined threshold of the color histogram bin value of the image.

Additional advantages, objects and features of the invention will become more apparent from the following description

BRIEF DESCRIPTION OF THE DRAWINGS

The present invention will become better understood with reference to the accompanying drawings which are given only by way of illustration and thus are not limitative of the present invention, wherein:

FIG. 1 is a view illustrating an example of a table of uniform quantization of a color histogram bin value according to the conventional art;

FIG. 3 is a view illustrating a table of non-uniform quantization of the color histogram bin value of the image according to the embodiment of the present invention.

DETAILED DESCRIPTION OF THE PREFERRED EMBODIMENTS

Figure 2:
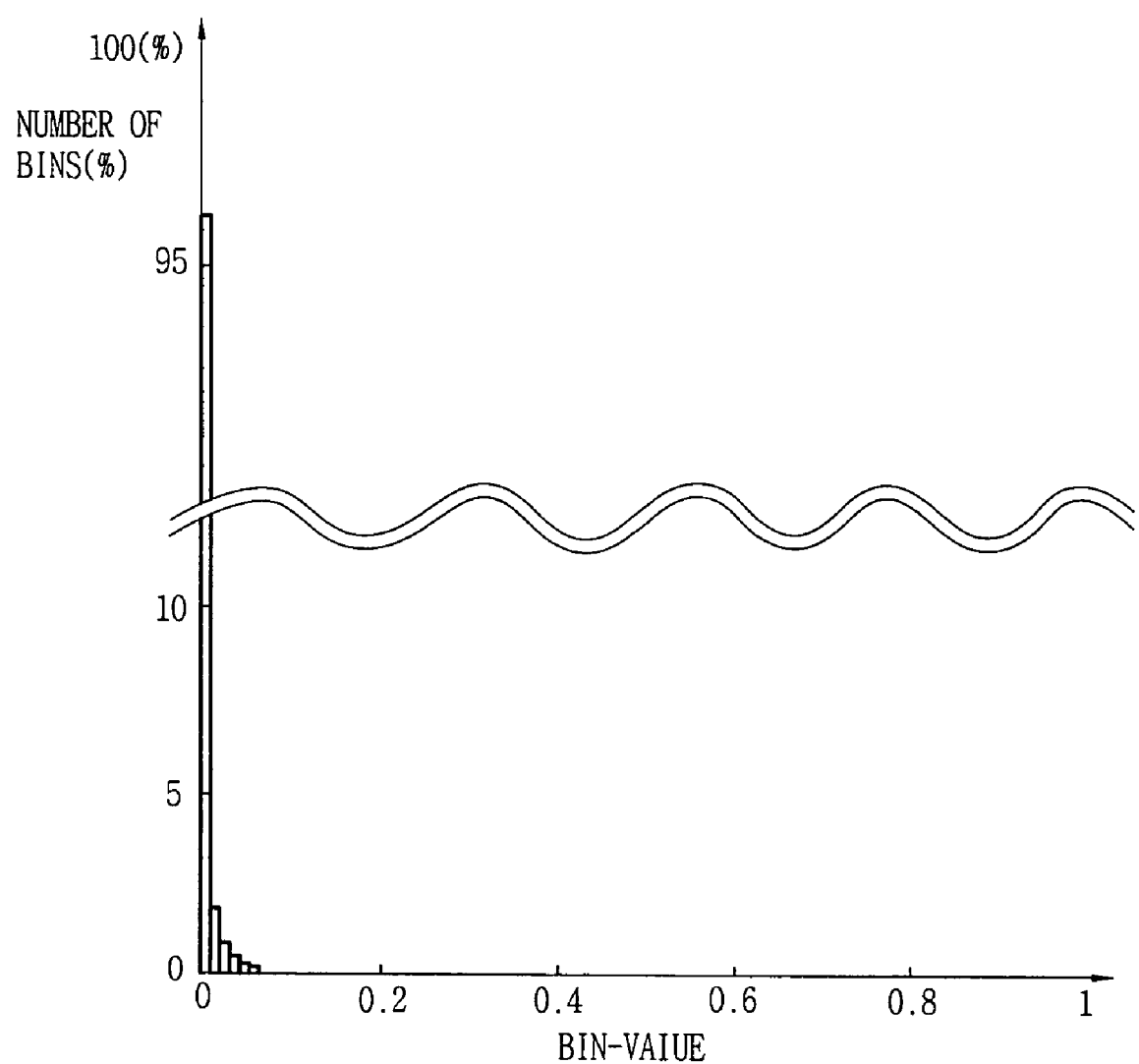
FIG. 2 is a view illustrating a percentage distribution of bins with respect to a color histogram bin value of an image according to an embodiment of the present invention.

FIG. 2 is a view illustrating a percentage distribution of bins with respect to a color histogram bin value of an image according to an embodiment of the present invention. In other words, it is a view illustrating an example in which the color histogram bin values of 512 colors in HMMD (Hue/Max/MIN/Difference) color space are calculated with 5466 images, and the frequency of color occurrence with respect to the calculated bin values is expressed as a percentage. Here, the above bin value is a normalization value of the frequency of color occurrence and each bin value is ranged from 0 to 1.

As illustrated therein, the distribution of the color histogram bin values shows the characteristics of the color distribution. In other words, the occurrence of the color histogram bin value of '0' is very frequent (e.g., the bins having a bin value of 0 account for 95% of all color histogram bins). And the occurrence of the color histogram bin value of '0.1' is very rare (there is almost no bins having a bin value of more than 0.1). In other words, when a natural visual image (or video) of a scenery, person, object, etc. is represented as a normalized color histogram, most of color histogram bins have a value of '0', and few of color histogram bins have a value greater than 0.1.

Here, the fact that the color histogram bin value is '0' means that the color corresponding to that bin is not existed in an image. In particular, it can be known that there are a few bins having a value of more than a predetermined threshold (e.g. 0.1).

FIG. 3 is a view illustrating a table of non-uniform quantization of the color histogram bin value of the image according to the embodiment of the present invention, which will now be described in detail with reference to FIG. 2. As illustrated therein, in the case where the color histogram bin value is non-uniformly quantized according to the color histogram bin value, the characteristics of the color histogram can be expressed more effectively as compared to the uniform quantization of a bin value according to the conventional art.

Particularly, if the color histogram bin value is '0', it can be the important information that the colors according to the bins don't appear in the image and the majority of all bins in the color histogram have a bin-value of '0', therefore, the color histogram bin value of '0' is mapped into a single quantum in quantizing the color histogram bin value. In real implementation, for a practical reason, '0' may be considered to the range between '0' and a number that is very close to '0' (e.g. 0.000000001).

Hence, since there are a few bins having a color histogram bin value of more than a predetermined threshold (0.1 in FIG. 2), that is, only a few colors have a high frequency of occurrence in the image, the all bin values of more than a predetermined threshold are mapped into a single quantum.

In addition, if the color histogram bin value is '0', it is expressed as quantum value (binary number 0000). The color histogram bin values greater than '0.1' (0.1~1.0) are expressed as quantum value '1' (binary number 1111). The color histogram bin value ranging from 0.0001 to 0.0999 (That is, the value of more than '0' and less than a threshold) is quantized as a plurality of appropriate sections, that is, divided finely.

Meanwhile, when a non-uniform quantization of the color histogram bin value is conducted, an uniform quantization can be conducted in the sections in which the color histogram bin value is greater than '0' and less than the threshold (0.0999).

However, to improve performance further, in the sections in which the color histogram bin value is greater than '0' and less than the threshold (0.0999), a non-uniform quantization can be conducted in consideration of the frequency of color occurrence.

As described above, the present invention has an effect of preserving the characteristics of the color histogram of a image(or video) better as compared to the conventional art, by means of non-uniform quantization to a bin value in consideration of the frequency of color occurrence of the image, e.g., the distribution of color histogram bin values.

In addition, when an image(or video) retrieval is conducted on the information of the color histogram representing effectively the characteristics of the color histogram of the image, the performance of image retrieval can be improved.

In addition, the performance of image retrieval can also be improved by means of the same amount of information as in the method for uniform quantization of a bin value according to the conventional art.

For example, the bin value range which a large number of bins belong to is divided into a plurality sections and is quantized finely, and the other side, the bin value range which a small number of bins belong to is quantized as a single section (In the conventional art, the color histogram bin value is uniformly quantized irrespective of the frequency of color histogram bin value). That is, if the range which a large number of bins belong to is divided into a plurality of sections and is quantized, then the original color information of the image(video) can be preserved well, and therefore the performance of the image retrieval is improved when the image(video) retrieval is conducted.

In addition, there is an effect of reducing the amount of information representing the characteristics of the color histogram of the image so as to acquire the same performance of the image retrieval as in the conventional method for uniform quantization of a bin value, For example, while 100 bytes are used to store the information of the uniform quantization of a color histogram bin value in the conventional art, a space smaller than 100 bytes can be used to store the same information in the method for non-uniform quantization of a color histogram bin value of an image according to the present invention. The reason thereof is because the bin value is expressed as a single bin or a few bins in the method for non-uniform quantization of a high bin value (e.g. the value greater than 0.1), while the bin value is expressed as a plurality of quanta in the method for uniform quantization of bins having a bin value of more than a threshold, thus making it possible to reduce the storage.

Moreover, in the case that a database is constructed by gathering information of the image characteristics, there is an effect of generating information more consistent with the visual/sensible characteristics of a human being by including the color histogram adapted by quantization of a bin value according to the present invention to the constructed database.

The present invention is not limited to the normal color histogram. Any histogram type descriptor can be applied in the present invention by analyzing histogram bin value distribution. As another embodiment of applying the present invention instead of the described normal color histogram, a non-uniform color structure histogram bin value quantization is described as follows.

The color structure histogram is computed by visiting (a subset of) all locations in the image, retrieving colors Cm of all pixels contained in the structure elements (e.g. 8 by 8 window) overlaid on each location, and incrementing the bin value corresponding to color Cm. After accumulating the bin values, they are non-uniformly quantized in to an 8-bit value as follows.

After normalizing bin values by dividing theoretic maximum bin value, each bin value becomes the number between 0 and 1. Then, the bin value range is divided into 6 regions, and subsequently a different number of quantization levels is allocated uniformly to each region. The thresholds defining each region of the bin value range (between 0.0 and 0.1) are: th0=0.000000001, th1=0.037, th2=0.08, th3=0.195, and th4=0.32. The numbers of quantization levels allocated to each described in the following table:

| Region | Number of levels |
|--------|------------------|
| 0      | 1                |
| 1      | 25               |
| 2      | 20               |
| 3      | 35               |
| 4      | 35               |
| 5      | 140              |

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method of describing a color image by non-uniform quantization of color histogram bin values for the image, comprising:

normalizing bin values by a maximum bin value, whereby the normalized bin values range from 0 to 1; and non-uniformly quantizing each normalized bin value to an 8-bit value by dividing the range of normalized bin values into 6 regions, each region having a specific number of uniform quantization levels, wherein the specific number of uniform quantization levels in each of the 6 regions is 1, 25, 20, 35, 35 and 140, respectively.

2. A method of describing a color image by non-uniform quantization of color histogram bin values for the image, comprising:

normalizing bin values by a maximum bin value, whereby the normalized bin values range from 0 to 1; and non-uniformly quantizing each normalized bin value to an 8-bit value by dividing the range of normalized bin values into 6 regions, wherein a threshold for each of the 6 regions is 0.000000001, 0.037, 0.08, 0.195, 0.32, respectively.

3. A method of generating a color histogram for an image, the color histogram containing a plurality of bins, the method comprising:

accumulating bin values;

normalizing bin values by a maximum bin value, whereby the normalized bin values range from 0 to 1; and non-uniformly quantizing each normalized bin value to an 8-bit value by dividing the range of normalized bin values into 6 regions, and allocating a different number of quantization levels to each region.

* * * * *